UNITED STATES PATENT OFFICE.

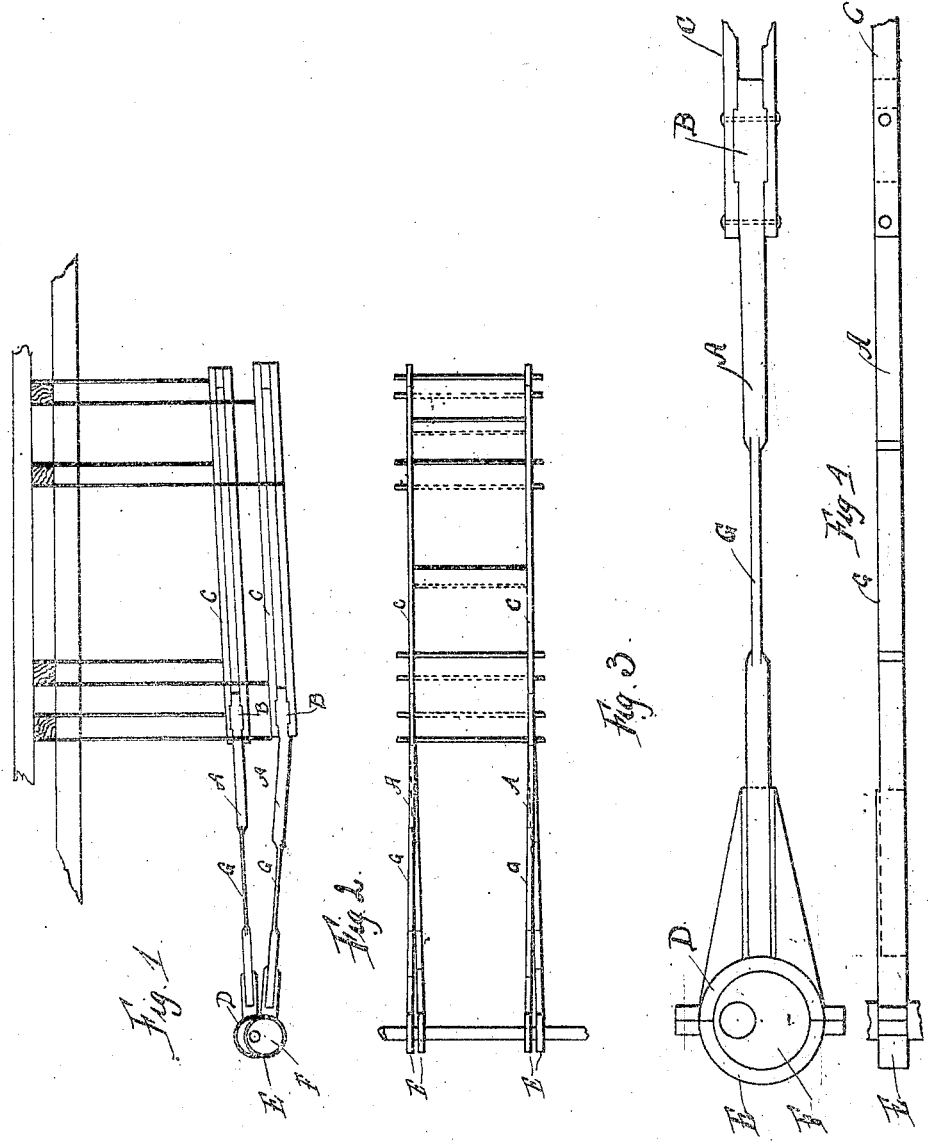

ARCHIE L. PARRISH AND JOHN H. LAMOREUX, OF WILKES-BARRE, PENNSYLVANIA.

PITMAN CONNECTION FOR SHAKERS.

No. 914,504.

Specification of Letters Patent.

Patented March 9, 1909.

Application filed October 11, 1906. Serial No. 338,452.

*To all whom it may concern:*

Be it known that we, ARCHIE L. PARRISH and JOHN H. LAMOREUX, citizens of the United States, residing at Wilkes-Barre, county of Luzerne, and State of Pennsylvania, have invented a certain new and useful Improvement in Pitman Connections for Shakers, of which the following is a specification.

Our invention relates to a new and useful improvement in connecting rods or pitmen for all classes of machinery where a reciprocating motion is to be had from an eccentric crank, and especially adapted for use in connection with coal shakers, and has for its object to so construct such a connecting rod as to provide for the oscillations thereof in following the movements of the eccentric without the necessity of using a joint or wrist pin, thereby making the rod more durable, and avoiding the vibrations and wear and tear now incident to such machinery.

With these ends in view, this invention consists in the details of construction and combination of elements hereinafter set forth and then specifically designated by the claim.

In order that those skilled in the art to which this invention appertains may understand how to make and use the same, we will describe its construction in detail, referring by letter to the accompanying drawing forming a part of this specification, in which—

Figure 1 is an elevation of a portion of a shaker showing two of our improved connecting rods secured thereto, the outer ends of said rods being connected with the eccentrics of the driving shaft; Fig. 2, a plan view of the same; Fig. 3, an enlarged side elevation of our improved connecting rod, and Fig. 4, a plan view thereof.

In the drawings A, represents the connecting rod or pitman having near its inner end an enlargement B, forming on its opposite sides two pairs of shoulders. The shaker has formed or secured on its side bar, a pair of members C, which are spaced apart and have opposite recesses in their adjacent faces in which the enlargement B, of the pitman is secured, such as by means of bolts, shown in Fig. 3. The outer end of the connecting rod is provided with the usual eccentric bearing D and strap E for attachment to the eccentric F whereby a reciprocating motion is given to the connecting rod and the shaker to which it is attached. To permit the connecting rod to follow the vertical movements of the eccentric the central portion thereof is cut away or reduced in thickness as indicated at G so as to produce sufficient flexibility to permit the rod to spring up and down.

One of the particular advantages of a connecting rod made in accordance with our improvement is that the rod is bolted fast to the shaker, having no movement at this point, and thus no wear or tear can take place, and a further advantage is that there being no movable connection between the rod and the shaker the machinery may be run at a much higher rate of speed without undue vibration, and no lost motion will be created by speeding up the machine, and of course no lubrication will be needed at the point of connection to the rod and shaft.

Of course we do not wish to be limited in the particular kind of material of which our improved connecting rod may be made as any material used for the purpose may be utilized.

Having thus fully described our invention, what we claim as new and useful, is—

The combination of a pitman having near its inner end an enlargement forming on its opposite sides two pairs of shoulders, a movably supported shaker, and a pair of members formed or secured on the side bar of said shaker, and spaced apart; said members having opposite recesses in their adjacent faces, and means securing the enlargement of the pitman in said recesses.

In testimony whereof, we have hereunto affixed our signatures in the presence of two subscribing witnesses.

ARCHIE L. PARRISH.
JOHN H. LAMOREUX.

Witnesses:
LEWIS M. LARNED,
OLIN F. HARVEY, Jr.